United States Patent [19]

Tschernatsch et al.

[11] Patent Number: 4,562,918
[45] Date of Patent: Jan. 7, 1986

[54] EN-MASS CONVEYOR FOR VERTICLE OR STEEP DELIVERY OF BULK MATERIAL

[75] Inventors: Günther Tschernatsch, Schwabach; Peter Kurz, Nuremberg, both of Fed. Rep. of Germany

[73] Assignee: M.A.N. Maschinenfabrik Augsburg-Nürnberg, Nuremberg, Fed. Rep. of Germany

[21] Appl. No.: 600,565

[22] Filed: Apr. 17, 1984

[30] Foreign Application Priority Data

Apr. 26, 1983 [DE] Fed. Rep. of Germany ....... 3315078

[51] Int. Cl.$^4$ ............................................. B65G 17/36
[52] U.S. Cl. .................................... 198/509; 198/604; 198/699; 198/716; 198/626; 198/819
[58] Field of Search ............... 198/626, 604, 606, 607, 198/698, 699, 509, 307, 716, 819, 627, 628; 414/133, 139, 143, 144

[56] References Cited

U.S. PATENT DOCUMENTS

| 2,849,102 | 8/1958 | Borrowdale | 198/605 |
| 4,230,220 | 10/1980 | Iino | 198/509 |
| 4,236,857 | 12/1980 | Willi | 198/509 |

FOREIGN PATENT DOCUMENTS

| 685023 | 12/1939 | Fed. Rep. of Germany | 198/628 |
| 2038841 | 2/1972 | Fed. Rep. of Germany | 198/626 |
| 944102 | 12/1963 | United Kingdom | 198/626 |

Primary Examiner—Joseph E. Valenza
Assistant Examiner—Darrell G. Dayoan
Attorney, Agent, or Firm—Felfe & Lynch

[57] ABSTRACT

An en-mass conveyor for vertically or steeply lifting bulk material has two, primary, flat, endless belt conveyors which are vertical or steeply-inclined throughout facing, correspondingly-progressing, material-conveying runs thus forming a belt shaft. One of the primary belts has flights or similar impellers which extend to the other belt in the belt shaft. Two, secondary, endless, flat belts laterally close the belt shaft along with one or two side or closure walls which are vertically immovable and provided with an opening for laterally feeding of the bulk material into the belt shaft for conveyance.

7 Claims, 3 Drawing Figures

EN-MASS CONVEYOR FOR VERTICLE OR STEEP DELIVERY OF BULK MATERIAL

BACKGROUND OF THE INVENTION

The invention relates to an en-mass conveyor and, more particularly, one for vertical or steep delivery of bulk material.

A known en-mass conveyor has a corrugated-edge, material-conveying endless belt. The belt is arranged with a leg which moves horizontally at the bottom end of the conveyor to feed the bulk material to be conveyed into the conveyor before turning for lifting the material. Flexible flights are arranged on another endless belt so that, as they turn around a bottom-end pulley, the flights dig into the bulk material and contact, flexibly, the carrying surface of the corrugated-edge belt as the two belts then lift the material, between them.

In this conveyor, the bottom-end, horizontal leg of the corrugated-edge belt causes increased wear on the corrugated-edge belt and on the corresponding, additional guiding rollers and deflection pulleys required. The penetration of the flights into the bulk material also leads to a relatively-high wearing rate of both belts and, in addition, the repetitive penetration-bending of the flights causes fatigue failure of the flights. Finally, this conveyor calls for maximum uniformity in loading the horizontal conveyor leg because, failing this, the filling of the cross-sectional area to the lift-conveying shaft between the belts will not be optimum or, where an excessive amount of bulk material is conveyed horizontally, high side forces are liable to arise in the vertical, lifting leg of the conveyor.

A bucket-elevator elevating conveyor is also known. Its buckets are filled via lateral chutes, each of which has the bulk material fed to it by a bucket-wheel. Bucket elevators, however, because they have empty spaces between the buckets, have a relatively lower delivery rate than a belt conveyor for the same cross-section and speed.

SUMMARY OF THE INVENTION

The present invention has for its objects providing an en-mass conveyor of the type initially referred to which features reduced wear on the corresponding primary conveyor belts, a lesser number of wearing idler points on the corresponding primary conveyor belts, and relatively lower wear on the flights or impellers which aid steep conveying.

To these and other ends, the invention provides two, primary, endless conveyor belts which extend facingly in a vertical or steeply-inclined, lifting-conveyance direction throughout their runs. These are formed as flat belts, without any side members, and the side closures are formed by two, separate, endless, flat, secondary belts running along the sides of the lifting conveyance direction. Depending on whether the bulk material feed is to be from one side or both sides, one or two side walls which are vertically immovable are positioned at the lower turn in the secondary conveyor belt and provided with an opening or openings for admitting the bulk material to be conveyed between the primary belts from the side. The side walls and the side belts are arranged at such vertical positions relative to each other that a complete delivery shaft is formed corresponding to the width of flights or similar impellers on one of the primary conveyor belts from a location beyond the point the bulk material enters this delivery shaft through the filling opening or openings and all along the lifting conveyance direction.

The flights or similar impellers are brought into their closed position extending between the two primary conveyor belts before loading. There is, therefore, practically no relative motion between the bulk material and the flights so that no appreciable wear can occur. The method of lateral filling eliminates the need for a horizontal leg at the bottom end of the primary conveyor which, in particular, reduces wear on the belts of this conveyor.

Moreover, the belt conveyor according to the invention can accommodate a nearly-complete column of the bulk material in the belt delivery shaft which, for a given cross-section and conveyor speed, enables a higher delivery rate than a bucket conveyor can achieved without overfilling being likely in certain longitudinal sections of the belt delivery shaft, as with the previously-described, known belt conveyor, because the bulk material merely fills from the side without scooping and compressing with the flights.

DESCRIPTION OF THE DRAWINGS

A preferred embodiment which is intended to illustrate but not to limit the invention is shown in the drawings in which.

DESCRIPTION OF THE PREFERRED EMBODIMENT

Figure 1:
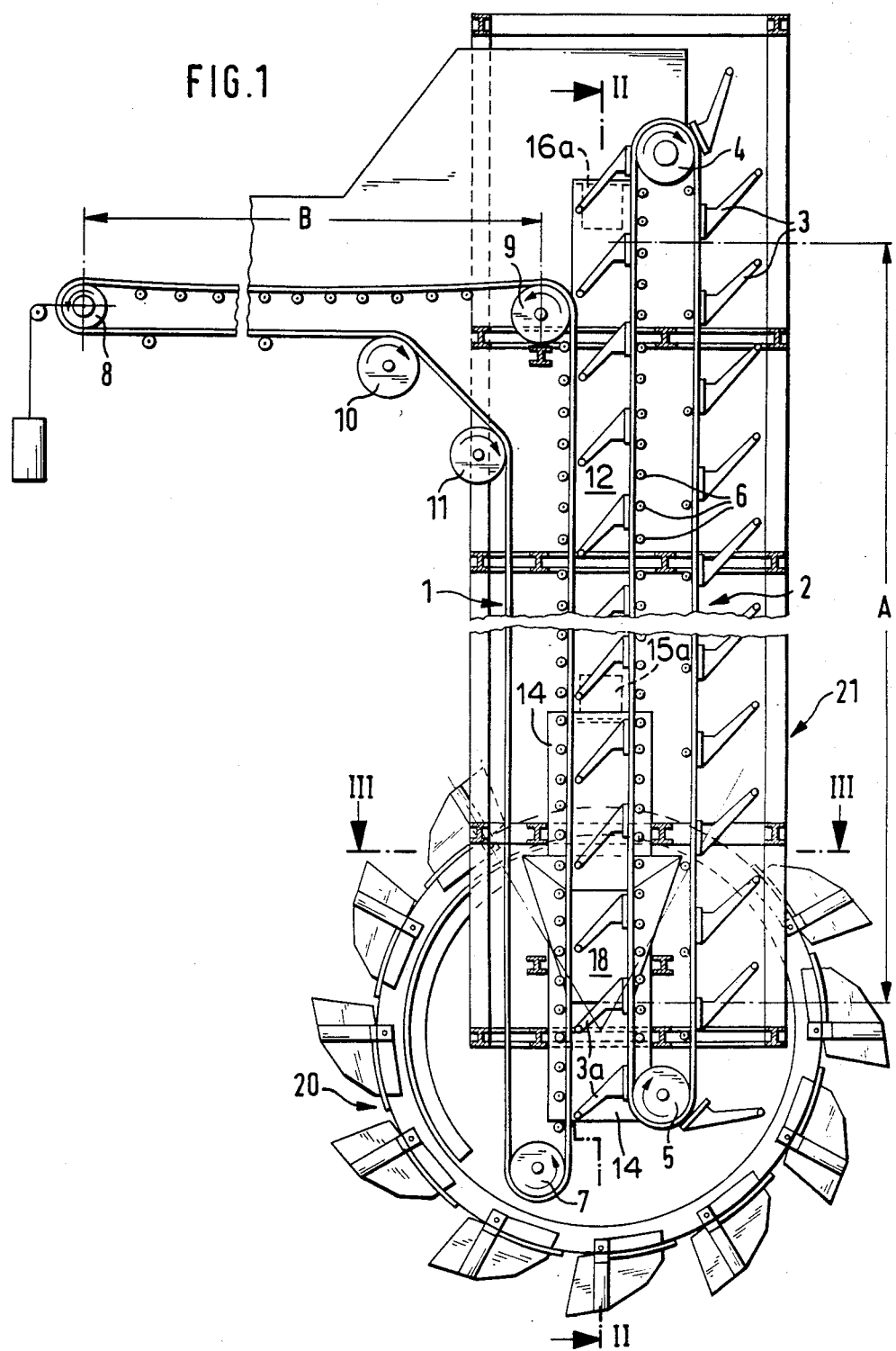
FIG. 1 is a side elevation of the preferred embodiment in section.
Figure 2:
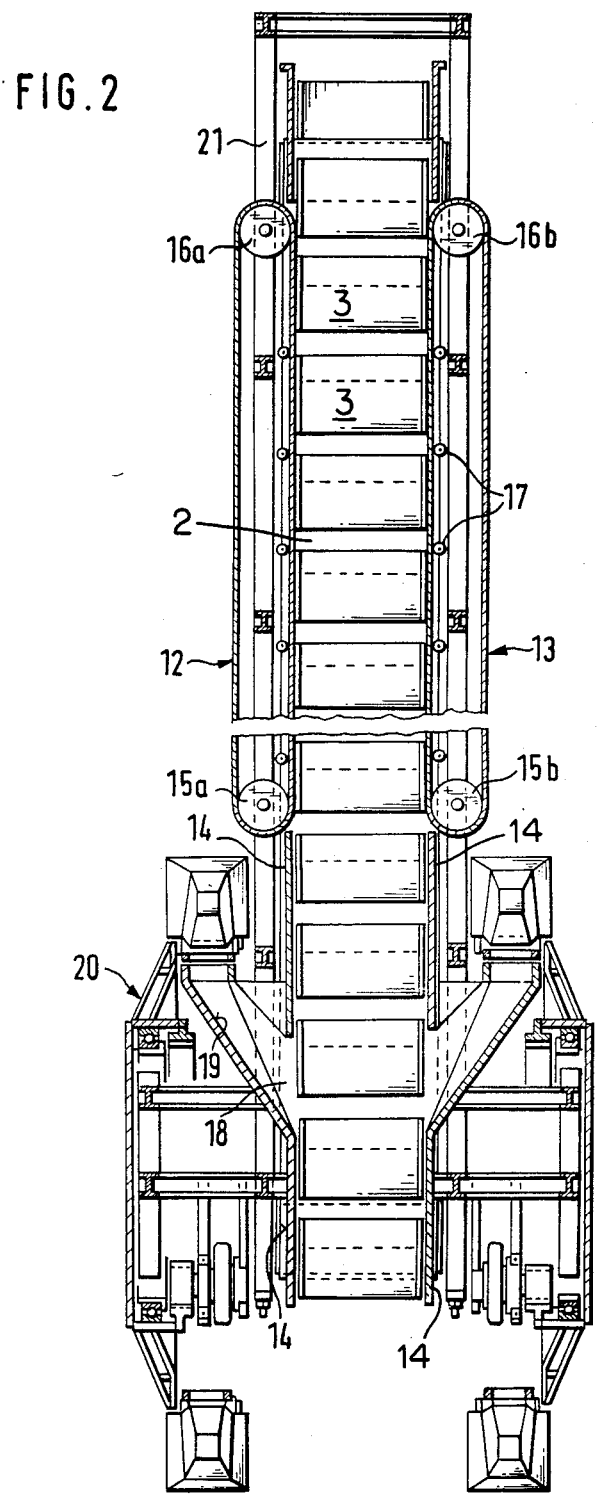
FIG. 2 is a longitudinal section of the preferred embodiment along the line II—II in FIG. 1.
Figure 3:
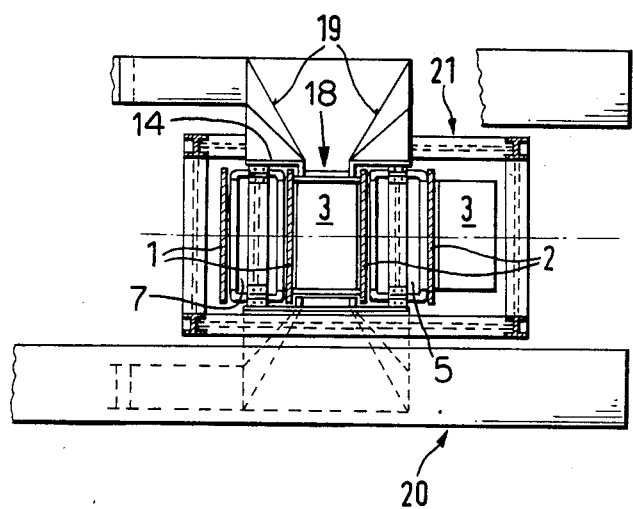
FIG. 3 is a cross-section of the preferred embodiment along the line III—III in FIG. 1.

The en-mass conveyor illustrated in the drawings operatively comprises a system of endless belts for vertical delivery of bulk material. More specifically, the en-mass conveyor is formed by two primary conveyor belts 1, 2 (FIG. 1), two laterally-arranged secondary conveyor belts 12, 13 (FIG. 2), and two lateral walls or closures 14 (FIG. 2) each, in this case, being provided with an opening 18 for filling the bulk material from the side.

The primary conveyors are endless flat belts 1, 2 without side members, such as corrugated edges or raised sides. One of the flat belts, e.g., 2 in this case, has flights 3 or similar impellers attached to it at regular longitudinal intervals transverse to the longitudinal direction of the belts. The bottom sections of the primary conveyors 1, 2 are vertical (or steeply inclined) throughout, the bottom end pulley 5 of the flat belt 2 fitted with flights 3 being vertically offset relative to the end pulley 7 of the other primary flat belt 1 so that the flights 3 round pulley 5 to contact belt 1.

In the embodiment illustrated, the flat belt 2 consists of only one leg for the vertical delivery. The flat belt 1, however, has two legs, A, B, the leg A being provided for vertical delivery (or steeply inclined delivery) and the leg B for horizontal discharge. Depending on the specific application, a different lay-out of the flat belts 1,2 may be adopted; what is important is that the bottom legs, i.e., the legs in the region of the bulk material in-feed to be described, of each flat belt 1, 2 is vertical or steeply inclined.

The flat belt 2 runs around a top drive pulley 4 and the bottom take-up pulley 5. By means of guiding and snubbing rollers 6, the flat belt 1 is similarly driven and gudied, both in a manner known per se.

The flat belt 1 runs from the bulk material feed point at take-up or tail pulley 7 at section A to a bulk material discharge point at a top, tension and drive pulley 8 at the end of the horizontal delivery section B. Deflection and take-up devices 9, 10, and 11 are assigned to the forward and reverse runs of the flat belt 2. Appropriate guiding and snubbing rollers complete the alignment of the flat belt 2 as before described.

In operation, the two flat belts 1, 2 are progressed at the same speed in opposite directions, clockwise and counterclockwise, so as to move in the same direction, up, along the belt shaft therebetween where flights 3 extend between the belts 1, 2.

The side walls of the belt shaft are formed by the two, vertical, secondary conveyor belts 12, 13, each of which is a flat belt without side elements arranged along either side of the primary conveyor belts 1, 2. The closure plates 14 or similar elements are arranged on either side adjacent to the conveyor belts, said closure plates or similar elements being provided with openings 18 for filling in the bulk material from the side.

The endless secondary belts 12, 13 are each taken around a bottom end pulley 15a, 15b and a top end pulley 16a, 16b, respectively. The end pulleys 15, 16 are not power-operated. The runs of the belts 12, 13 facing the primary conveyor belts are, instead, forced by rollers 17 against the corresponding edges of the primary conveyor belts 1, 2.

The bulk material passes to the filling openings 18 in the closure plates 14 through suitable guiding devices, e.g., chutes 19. The closure plates 14 are attached vertically immovably to the chutes 19. At each side of the primary conveyors 1, 2, there is a digging device, typically a bucket-wheel 20, the buckets of which pick-up the bulk material, raise it, and discharge it into the chutes 19. Accordingly, the closure plates 14 extend roughly from the level of the bucket wheel top downwards, whereas the belts 12, 13 extend roughly from the top level of the closure plates 14 upwards.

The bucket wheels 20, the chutes 19 including the closure plates 14, and the corresponding parts of the en-mass conveyor are secured in a supporting structure 21 which, in the case of unloaders, is suspended from the boom of the unloader.

Below the filling openings 18, the closure plates 14 and the two primary conveyors 1, 2 are extended downwards far enough that a complete longitudinal delivery section delimited by two consecutive flights 3 extending between belts 1, 2 is closed for the bulk material to enter.

The flights 3 are each formed with a base element by means of which they are connected to the flat belt 2 and a bar, vane or similar impeller extending obliquely upwards or downwards to front edges in positive contact with the forward or belt-shaft run of the flat belt 1. The flights 3 or similar impellers may each be movable by a few angular degrees about an axis (here horizontal) extending transverse to the longitudinal direction of belt 2 or immovably attached to the belt. In the embodiment illustrated in FIG. 1, the flights 3 are immovably connected to the flat belt 2, extend downwards in the belt shaft delivery section, and bear with their front edges on the forward run of the flat belt 1.

Filling the belt shaft delivery section can be effected from only one side, in which case only one pick-up device, such as the bucket wheel 20 or a rotary cutter, helical conveyor or similar device is provided. The secondary belt corresponding to belt 12 or, alternatively, 13 at the side opposite the single pick-up device would then extend roughly down to the level of the bottom of the take-up pulley 7 and no closure plate 14 would be provided on this side.

As another alternative to the embodiment illustrated, it is also possible to have both primary belts, corresponding to belts 1, 2, arranged only vertically or steeply inclined and to transfer the bulk material at the top discharge point with suitable guiding devices onto a separate horizontal conveyor which, however, is not illustrated in the drawings.

The en-mass conveyor system according to the invention is suitable, for instance, for use as a ship unloader, as a substitute for a tripper on a stacker, as a stock-out device on a reclaiming bridge spanning a storeyard, as part of a coal handling plant for a power station, in a material supply system for steelworks, and for other bulk-material elevating systems.

OPERATION

As described above, the offset of the pulleys 5, 7 and the positioning and dimensions of the adjacent part of the closure plates 14 are such that, upon progression of the primary conveyor belts 1, 2, two consecutive flights 3a extend from belt 2 to belt 1 at the upstream end of the belt shaft before being progressed to the opening 18 for the bulk material to form, between the flights 3a, belts 1, 2, and plates 14, a closed compartment for receiving the bulk material. The bulk material is received in this compartment when the primary belts progress the flights 3a together to the openings 18, there thus being no relative motion between the belts or flights when material is received to produce wear.

The bucket wheels 20 dump the bulk material into the chutes 19 to the openings 18. If the chutes 19 should fill, the bucket wheels also carry away the excess material. The bulk material thus fills each closed compartment between consecutive flights 3 through the openings 18 only under the action of gravity along the chutes 19. Each compartment between consecutive flights 3 can thus be filled to build a substantially continuous column of the material along the belt shaft for efficiency, but there is no mechanical compaction to lead to wear-producing and otherwise-undesirable lateral pressures along the belt shaft.

Further coordinated progression of the primary belts 1, 2 lifts the bulk material in each compartment between flights 3 to the opposite, top end of the closure plates which is conveniently above the bucket wheels 20 to provide room for the pulleys 15a, 15b of the secondary belts 12, 13. The secondary belts round these pulleys sufficiently closely to the adjacent edge of the closure plates 14 that the bulk material in the progressing compartments between the flights 3 is not substantially lost, and press toward the edges of the flat primary conveyor belts 1, 2 sufficiently for the same.

The secondary belts 12, 13 thus continue the lateral closure of the belt shaft along the remainder thereof and are entrained to progress with the primary conveyor belts 1, 2 therealong. In this way, for most of the belt shaft along which the secondary belts are entrained, the bulk material is conveyed in totally-progressing, closed compartments. There thus is no friction from dragging the material, flights, or belts relatively past other parts of the en-mass conveyor, and thus, importantly, no wear therefrom.

The bulk material is thus discharged from the end of the belt shaft toward which it is progressed. For this, the leg B of the primary belt 1 extends away from the other primary belt 2 but, in other embodiments, one of the other belts or other arrangements may do this.

It will be understood that the foregoing specification and examples are illustrative but not limitative of the present invention and that other embodiments within the spirit and scope of the invention will suggest themselves to those skilled in the art.

What is claimed is:

1. An en-mass conveyor for bulk material, comprising:
    first and second primary-conveyor, flat, endless belts and means arranging them with facing, correspondingly-progressing runs for defining therebetween a belt shaft along which the bulk material is conveyed;
    flights projecting from one primary-conveyor belt to the other along the belt shaft for aiding the material conveyance;
    first and second secondary-conveyor, flat, endless belts laterally closing the belt shaft between the primary-conveyor belts along at least a substantial part of the belt shaft; and
    a closure plate at one, upstream end of at least one of the secondary-conveyor belts, continuing the lateral closing of the belt shaft, and having an opening therethrough to the belt shaft for admitting the bulk material into the belt shaft between consecutive flights for conveyance therealong.

2. The conveyor of claim 1, and further comprising:
    a chute communicating with each opening through the closure plate for gravity feeding the bulk material thereto; and
    supply means for supplying the bulk material to the chute.

3. The conveyor of claim 2, wherein the supply means comprises a bucket wheel.

4. The conveyor of claim 1, wherein the primary-conveyor belts are arranged such that two consecutive flights project between the primary-conveyor belts before they correspondingly progress to the opening in the closure plate.

5. The conveyor of claim 2, wherein the primary-conveyor belts are arranged such that two consecutive flights project between the primary-conveyor belts before they correspondingly progress to the opening in the closure plate.

6. The conveyor of claim 3, wherein the primary-conveyor belts are arranged such that two consecutive flights project between the primary-conveyor belts before they correspondingly progress to the opening in the closure plate.

7. An en-mass conveyor for bulk material, comprising:
    first and second primary-conveyor, flat, endless belts and means arranging them with facing, correspondingly-progressing runs for defining therebetween a belt shaft along which the bulk material is conveyed;
    flights projecting from one primary-conveyor belt to the other all along the belt shaft for aiding the material conveyance and receiving the bulk material between consecutive flights;
    first and second secondary-conveyor, flat, endless belts laterally closing the belt shaft between the primary-conveyor belts along at least a substantial part of the belt shaft;
    a closure plate at one, upstream end of at least one of the secondary-conveyor belts, continuing the lateral closing of the belt shaft, and having an opening therethrough to the belt shaft for admitting the bulk material into the belt shaft between consecutive flights for conveyance therealong;
    a chute communicating with each opening through the closure plate for gravity feeding the bulk material thereto; and
    supply means for supplying the bulk material to the chute.

* * * * *